US011321258B2

(12) United States Patent
Chiu et al.

(10) Patent No.: US 11,321,258 B2
(45) Date of Patent: May 3, 2022

(54) INTEGRATED CIRCUIT, BUS SYSTEM AND SCHEDULING METHOD

(71) Applicant: Nuvoton Technology Corporation, Hsinchu Science Park (TW)

(72) Inventors: Kang-Fu Chiu, Hsinchu (TW); Chih-Hung Huang, New Taipei (TW); Chun-Wei Chiu, New Taipei (TW); Hao-Yang Chang, Houlong Township (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/010,401

(22) Filed: Sep. 2, 2020

(65) Prior Publication Data

US 2021/0081341 A1    Mar. 18, 2021

(30) Foreign Application Priority Data

Sep. 12, 2019  (TW) ................................ 108132900

(51) Int. Cl.
*G06F 1/26* (2006.01)
*G06F 13/42* (2006.01)
*G06F 13/362* (2006.01)

(52) U.S. Cl.
CPC ................ *G06F 13/362* (2013.01)

(58) Field of Classification Search
None
See application file for complete search history.

(56) References Cited

U.S. PATENT DOCUMENTS

| 8,683,163 | B2* | 3/2014 | Morfey | G06F 9/30145 |
| | | | | 711/167 |
| 2003/0126222 | A1 | 7/2003 | Peterson | |
| 2007/0266193 | A1* | 11/2007 | Sommer | G06F 1/263 |
| | | | | 710/301 |
| 2018/0143935 | A1* | 5/2018 | Cox | G06F 13/4221 |
| 2018/0373666 | A1* | 12/2018 | Tseng | G01R 31/50 |
| 2019/0332472 | A1* | 10/2019 | Hong | G06F 11/1068 |

* cited by examiner

*Primary Examiner* — Hyun Nam
(74) *Attorney, Agent, or Firm* — Muncy, Geissler, Olds & Lowe, P.C.

(57) ABSTRACT

An integrated circuit includes a specific pin, an output circuit, a voltage detector, and a controller. The output circuit is coupled to the specific pin. The voltage detector obtains a detection voltage value from the specific pin. In response to an alert request, the controller provides a control signal to the output circuit based on the detection voltage value, so as to selectively control the output circuit to transmit the alert signal to the specific pin. When the control signal instructs the integrated circuit to operate in a blocking mode, the output circuit blocks the alert signal from being transmitted to the specific pin. When the control signal instructs the integrated circuit to operate in a transmission mode, the output circuit transmits the alert signal to the specific pin.

10 Claims, 10 Drawing Sheets

INTEGRATED CIRCUIT, BUS SYSTEM AND SCHEDULING METHOD

CROSS-REFERENCE TO RELATED APPLICATION

This application claims the benefit of Taiwan Patent Application No. 108132900 filed on Sep. 12, 2019, in the Taiwan Intellectual Property Office, the disclosure of which is incorporated herein in its entirety by reference.

BACKGROUND OF THE INVENTION

1. Field of the Invention

The present invention relates to a bus system, and more particular to a bus system having a plurality of slave devices.

2. Description of the Related Art

In a conventional computer system, a chip set such as a south bridge chip is electrically connected to the other external circuit module (such as a system-on-a-chip (SoC) with various functions) through a low pin count (LPC) interface. The external circuit modules coupled through the LPC interface are respectively assigned to different independent addresses. As a result, the south bridge chip communicates with the external circuit modules by one-to-many communication. However, in recent years, an aspect of the new bus architectures, such as an enhanced serial peripheral interface (eSPI) bus, began only allowing a one-to-one communication mechanism to be employed between the chip set and the external circuit modules.

Therefore, what is need is to develop a scheduling scheme for multiple circuit modules of a bus system.

SUMMARY OF THE INVENTION

An objective of the present invention is to provide an integrated circuit, a bus system and a scheduling method, so as to solve above-mentioned problems.

In order to achieve the objective, the present invention provides an integrated circuit comprising a specific pin, an output circuit, a voltage detector, and a controller. The output circuit is coupled to the specific pin. The voltage detector is coupled to the specific pin, and configured to obtain a detection voltage value from the specific pin. In response to an alert request, the controller provides the control signal to the output circuit based on the detection voltage value, so as to selectively control the output circuit transmit the alert signal to the specific pin. When the control signal instructs the integrated circuit to operate in a blocking mode, the output circuit blocks the alert signal from being transmitted to the specific pin, and when the control signal instructs the integrated circuit to operate in a transmission mode, the output circuit transmits the alert signal to the specific pin.

In order to achieve the objective, the present invention provides a bus system comprising a master device, a bus, and slave devices. The slave devices are electrically connected to the master device through the bus. Each slave device comprises an alert handshake pin, and the alert handshake pins of the slave devices are electrically connected to each other through an alert handshake control line. When at least one of the slave devices is operated in a blocking mode, the at least one of the slave device does not drive the alert handshake control line through the corresponding alert handshake pin.

In order to achieve the objective, the present invention provides a scheduling method, which is applied to one of slave devices of a bus system. The slave devices are electrically connected to a master device through a bus, and each of the slave devices comprises an alert handshake pin, and the alert handshake pins of the slave devices are electrically connected to each other through an alert handshake control line, and the scheduling method comprises steps of: through the alert handshake pin, obtaining a detection voltage value of the alert handshake control line; in response to an alert request, determining whether to transmit an alert signal to the alert handshake control line through the alert handshake pin, based on the detection voltage value.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
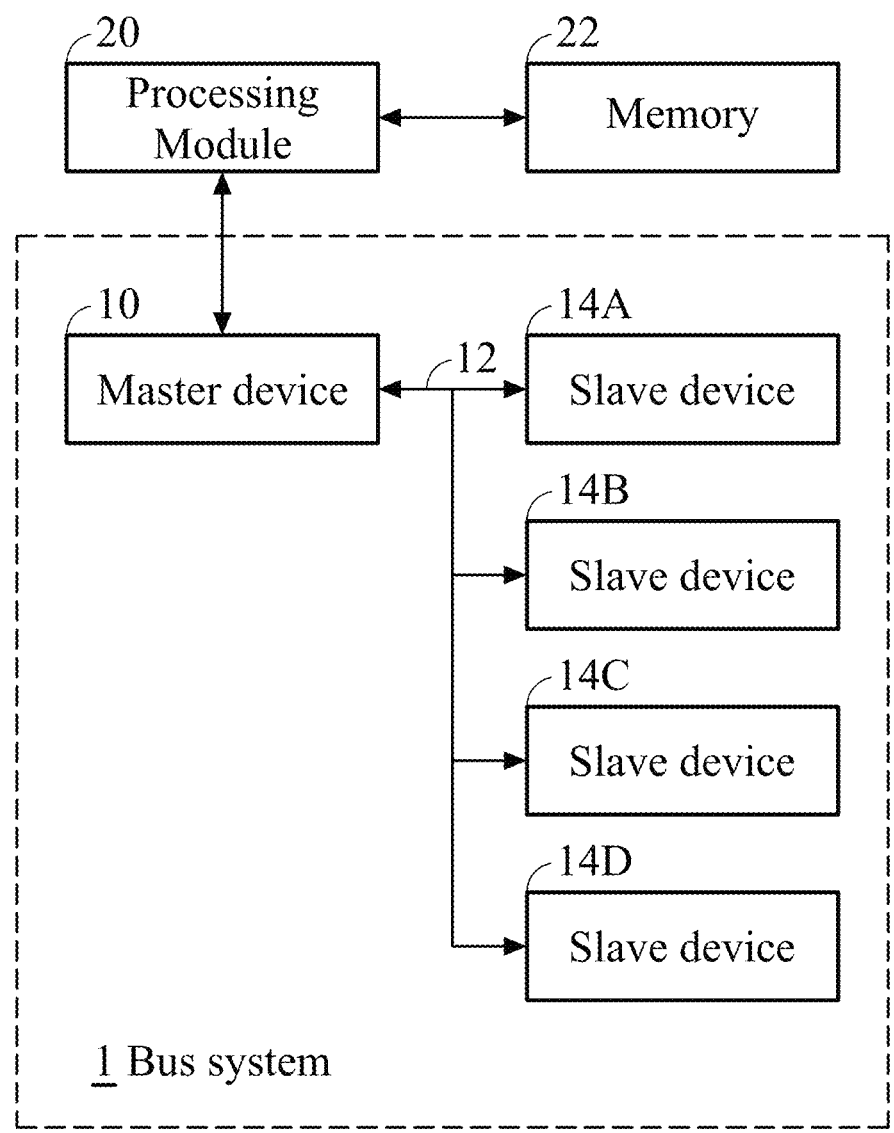
FIG. 1 is a bus system of an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

FIG. 1 shows a bus system 1 of an embodiment of the present invention. The bus system 1 comprises a master device 10, a bus 12, and a plurality of slave devices 14A-14D. In some embodiments, the master device 10 can be a Southbridge chip. In some embodiments, the master device 10 can be electrically connected to a processing module 20 of a computer system, which is not shown in figures, so that the master device 10 accesses the slave devices 14A-14D through the bus 12 in response to an instruction of the processing module 20. In some embodiments, the processing module 20 is electrically connected to a memory 22 of the computer system, so as to access the memory 22 based on requests of different applications. In some embodiments, the bus 12 can be an enhanced serial peripheral interface (eSPI) bus. The master device 10 is electrically connected to the slave devices 14A-14D through the bus 12. Furthermore, the master device 10 communicates with the slave devices 14A-14D by a one-to-one communication mechanism, and the slave devices 14A-14D perform an arbitration mechanism to communicate with the master device 10. It should be noted that the number of the slave devices 14A-14D shown in figures is merely an example for illustration, and the present invention is not limited thereto.

Figure 2:
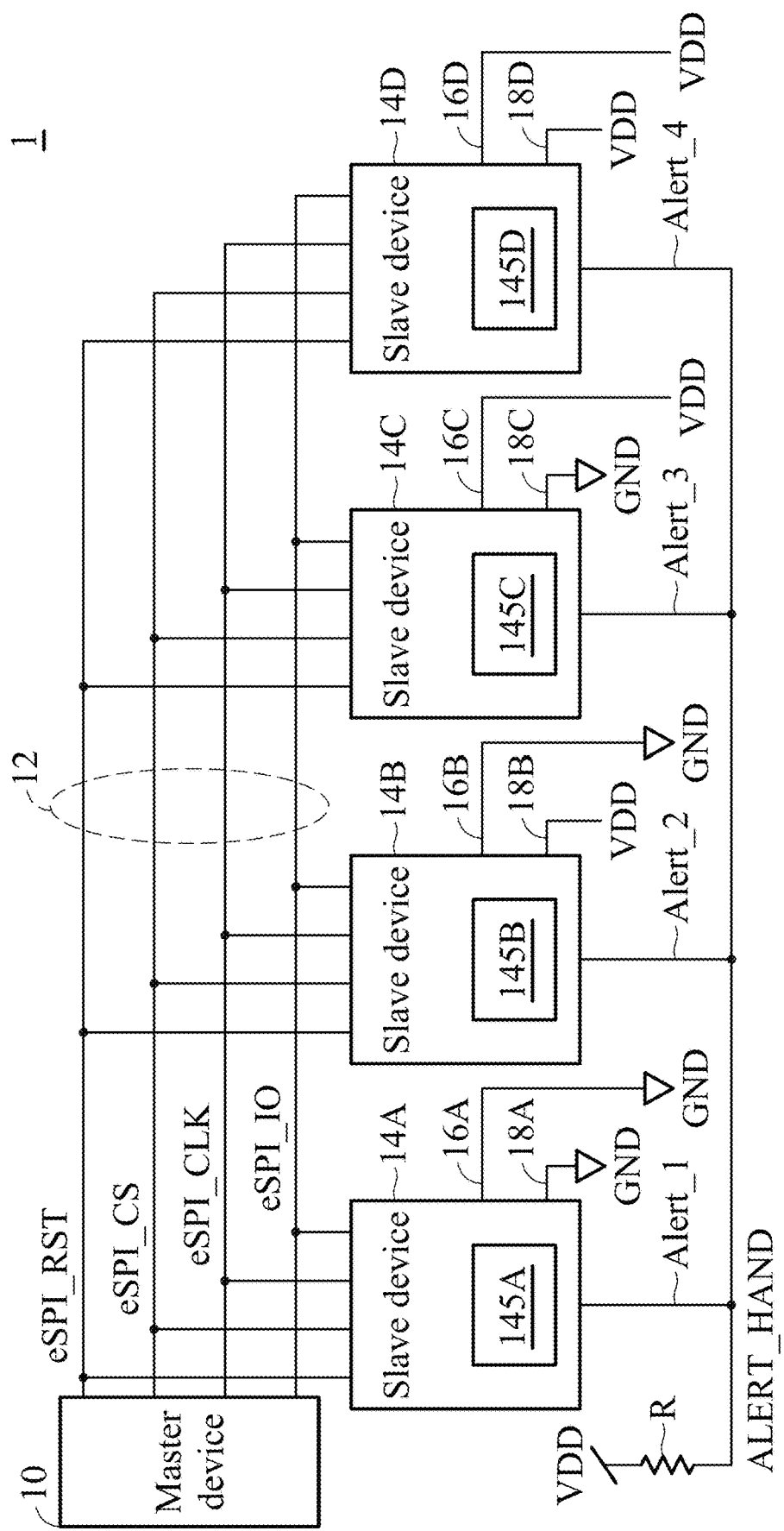
FIG. 2 is a connection configuration diagram of the bus system of FIG. 1.

FIG. 2 shows a connection configuration diagram of the bus system 1 of FIG. 1. In this embodiment, the bus 12 comprises a reset signal line eSPI_RST, a chip-select signal line eSPI_CS, a clock signal line eSPI_CLK, and an input/output (I/O) signal line eSPI_IO The master device 10 starts to communicate with the slave devices 14A-14D through chip-select signal line of eSPI_CS based on a one-to-one communication mechanism. Furthermore, by the arbitration mechanism, one of the slave devices 14A-14D communicates with the master device 10 through the input/output (I/O) signal line eSPI_IO, for example, transmit data and instruction through the input/output (I/O) signal line eSPI_IO When the master device 10 communicates with one of the slave devices 14A-14D through the bus 12, a clock signal on the clock signal line eSPI_CLK is used as a reference clock.

In general, according to the operation mechanism of the chip-select signal line eSPI_CS, the master device 10 selects and communicates single device only. However, by using the arbitration mechanism of the present invention, in the bus system 1 only one of the slave devices 14A-14D responses to the master device 10 at a single time slot. Therefore, even the master device 10 is operated in the one-to-one communication mechanism, the chip-select signal line eSPI_CS of the bus 12 is connected to the slave devices 14A-14D for further communication, so as to improve expansion of the bus system 1.

As shown in FIG. 2, the slave devices 14A-14D comprise address section selection pins 18A-18D, address entry selection pins 16A-16D, and alert handshake pins Alert_1-Alert_4, respectively. The addresses corresponding to the slave devices 14A-14D are allocated based on combination of voltage levels received by the address section selection pins 18A-18D and the address entry selection pins 16A-16D, so that the slave devices 14A-14D have different address sections from each other. For example, the address section selection pins 18A and 18C of the slave devices 14A and 14C are coupled to ground GND and correspond to a first address section. The address entry selection pins 16A and 16C of the slave devices 14A and 14C are coupled to ground GND and power supply VDD, respectively, and correspond to different address entry codes, respectively, for example, correspond to a first address and a second address of the first address section, respectively. Furthermore, the address section selection pins 18B and 18D of the slave devices 14B and 14D are coupled to power supply VDD and correspond to a second address section. The address entry selection pins 16B and 16D of the slave devices 14B and 14D are coupled to ground GND and the power supply VDD, respectively, and correspond different address entry codes, for example, the address entry selection pins 16B and 16D correspond to a first address and a second address of the second address section, respectively.

The alert handshake pins Alert_1-Alert_4 of the slave devices 14A-14D are electrically connected to an alert handshake control line ALERT_HAND. In this embodiment, the alert handshake control line ALERT_HAND is electrically connected to the power supply VDD through a pull-up resistor R, so that the alert handshake control line ALERT_HAND is at a high voltage level, which indicates a high logic signal "H". Furthermore, the controllers 145A-145D of the slave devices 14A-14D control the corresponding alert handshake pins Alert_1-Alert_4 to be at a low voltage level, which indicate a low logic signal "L", so as to drive the alert handshake control line ALERT_HAND to be the low voltage level. Each of the slave devices 14A-14D controls the voltage level of the alert handshake control line ALERT_HAND to obtain the right of actively communicating with the master device 10. The alert handshake pins Alert_1-Alert_4 are bi-directional input/output pins, which can be open-drain in an output mode.

In some embodiments, the alert handshake control line ALERT_HAND is electrically connected to ground GND through a pull-down resistor, which is not shown in figures, so that the alert handshake control line ALERT_HAND can be at the low voltage level, which indicates a low logic signal "L". Furthermore, the controllers 145A-145D of the slave devices 14A-14D can control the corresponding alert handshake pins Alert_1-Alert_4 to be at the high voltage level, which indicates a high logic signal "H", to drive the alert handshake control line ALERT_HAND to be at the high voltage level. Therefore, each of the slave devices 14A-14D can control the voltage level of the alert handshake control line ALERT_HAND, to obtain the right of actively communicating with the master device 10.

Figure 3:
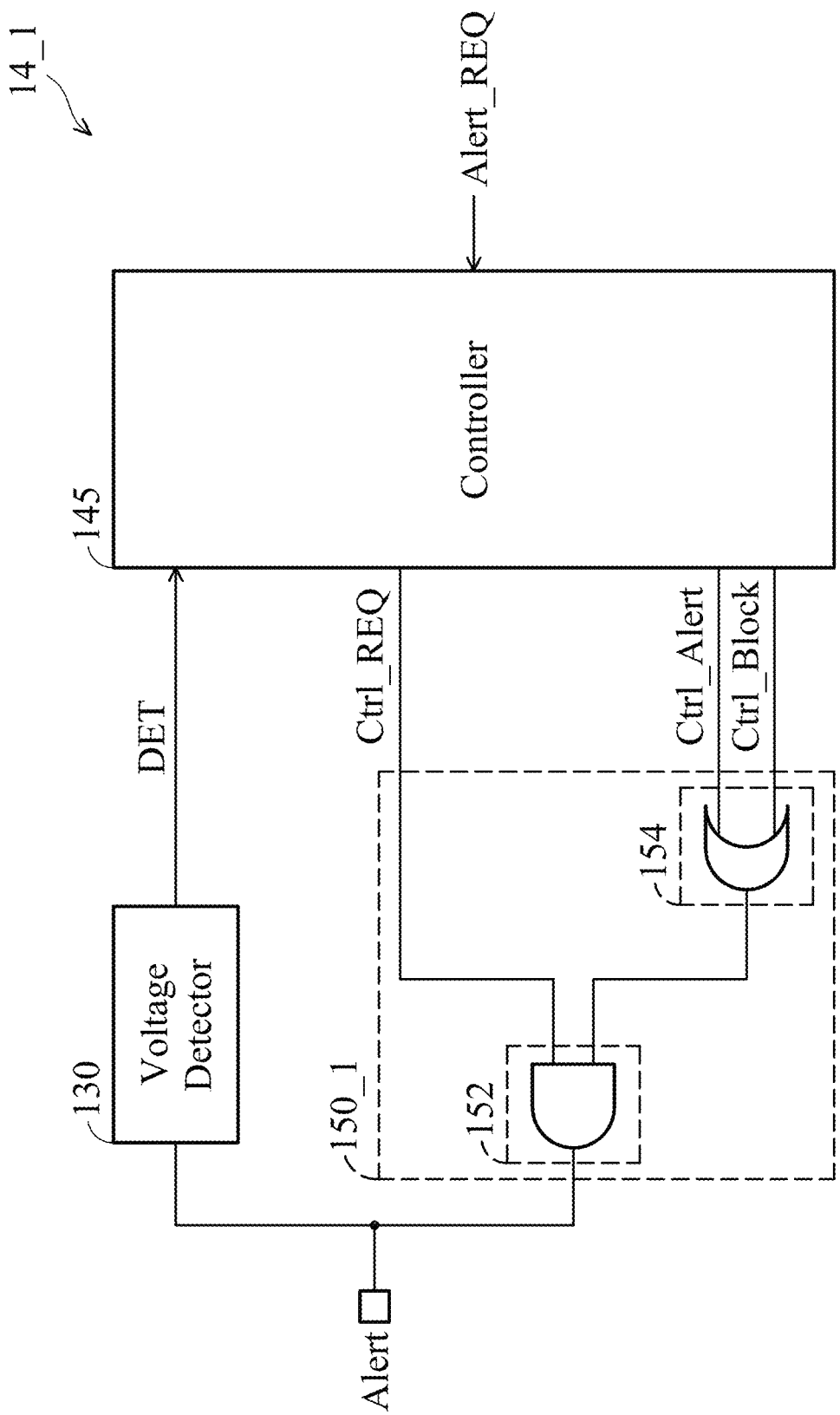
FIG. 3 is schematic diagram of a slave device of an embodiment of the present invention.

FIG. 3 shows a schematic diagram of a slave device 14_1 of an embodiment of the present invention. The slave device 14_1 includes an alert handshake pin Alert, a voltage detector 130, a controller 145, and an output circuit 150_1. The voltage detector 130 and the output circuit 150_1 are electrically connected to the alert handshake pin Alert. Furthermore, the controller 145 can provide a control signal Ctrl_Block, to the output circuit 150_1, to notify the output circuit 150_1 that the slave device 14_1 is operated in a blocking mode or a transmission mode.

As shown in FIG. 3, an interrupt request Alert_REQ indicates that the slave device 14_1 wants to communicate with the master device 10 of FIG. 2. In some embodiments, the interrupt request Alert_REQ can be provided by other circuit, which is not shown in figures, of the slave device 14_1. In some embodiments, the interrupt request Alert_REQ can be generated by the controller 145. When receiving the interrupt request Alert_REQ, the controller 145 can provide a control signal Ctrl_REQ, to the output circuit 150_1, so as to transmit the control signal Ctrl_REQ to the alert handshake pin Alert through the output circuit 150_1, thereby driving the alert handshake control line ALERT_HAND. After the alert handshake control line ALERT_HAND is driven, the controller 145 can use the voltage detector 130 to detect or measure the alert handshake pin Alert, to obtain a detection voltage value DET of the alert handshake control line ALERT_HAND. Next, the controller 145 can determine whether the alert handshake control line ALERT_HAND is driven by other slave device, based on the detection voltage value DET. For example, when the detection voltage value DET of the alert handshake control line ALERT_HAND is lower than a power voltage level of the power supply VDD, the controller 145 can determine that the alert handshake control line ALERT_HAND is driven by other slave device; otherwise, when the detection voltage value DET of the alert handshake control line ALERT_HAND is substantially the same as the power voltage level of the power supply VDD, the controller 145 can determine that the alert handshake control line ALERT_HAND is not driven by other slave device. After determining that the alert handshake control line ALERT_HAND is not driven by other slave device, the controller 145 can provide the control signal Ctrl_Alert to the output circuit 150_1. When the control signal Ctrl_Block instructs the slave device 14_1 to operate in the blocking mode, the output circuit 150_1 does not transmit the control signal Ctrl_Alert to the alert handshake pin Alert, that is, the control signal Ctrl_Alert is blocked. As a result, the slave device 14_1 is unable to drive the alert handshake control line ALERT_HAND through the alert handshake pin Alert. In the other hand, when the control signal Ctrl_Block instructs the slave device 14_1 to operate in the transmission mode, the output circuit 150_1 transmits the control signal Ctrl_Alert to the alert handshake pin Alert, to drive the alert handshake control line ALERT_HAND, so that the slave device 14_1 can communicate with the master device 10 of FIG. 2, such as, for processing the interrupt request. After the communication between the device 14_1 and the master device 10 is completed, the controller 145 stops providing the control signal Ctrl_Alert to the output circuit 150_1, so that the slave device 14_1 does not drive the alert handshake control line ALERT_HAND through the alert handshake pin Alert, that is, the slave device 14_1 stops driving the alert handshake control line ALERT_HAND.

In FIG. 3, the voltage detector 130 detects or measures the alert handshake control line ALERT_HAND through the alert handshake pin Alert, to obtain the detection voltage value DET of the alert handshake control line ALERT_HAND. Furthermore, the output circuit 150_1 can include logic circuits 152 and 154. In this embodiment, the logic circuit 152 can be an AND logic gate, and the logic circuit 154 can be an OR logic gate. The logic circuit 152 can control the alert handshake pin Alert based on the control signal and Ctrl_Alert and the control signal Ctrl_REQ. The logic circuit 154 can determine whether the control signal Ctrl_Alert is provided to the logic circuit 152, based on the control signal Ctrl_Block. As mentioned previously, when the control signal Ctrl_Block instructs the slave device 14_1 to operate in the blocking mode, the logic circuit 154 does not provide the control signal Ctrl_Alert to the logic circuit 152. In the other hand, when the control signal Ctrl_Block instructs the slave device 14_1 to operate in the transmission mode, the logic circuit 154 provides the control signal Ctrl_Alert, to the logic circuit 152. It should be noted that the logic circuits 152 and 154 are examples only, the present invention is not limited thereto.

Figure 4:
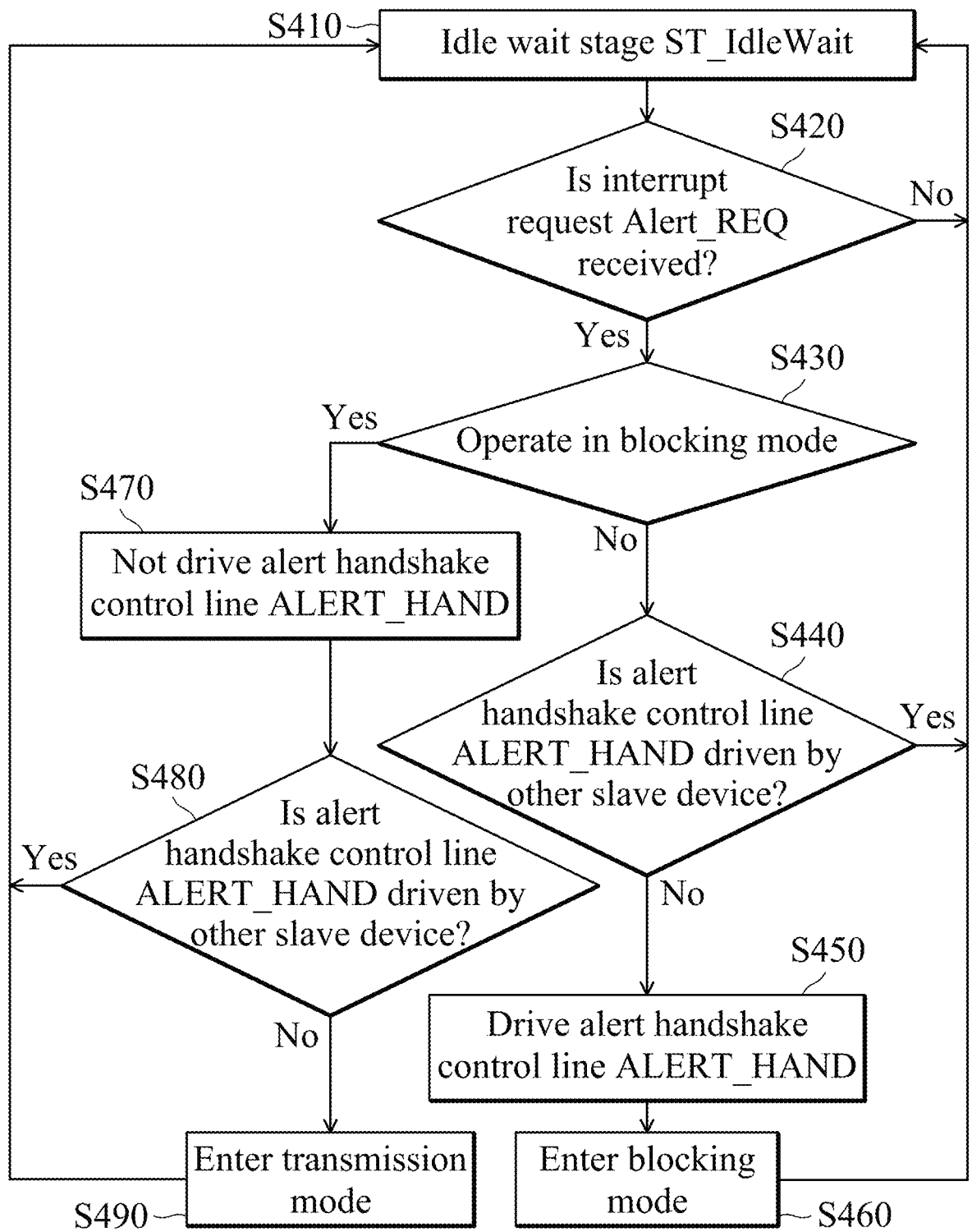
FIG. 4 is a flowchart of a scheduling control method of a bus system of an embodiment of the present invention.
Figure 5:
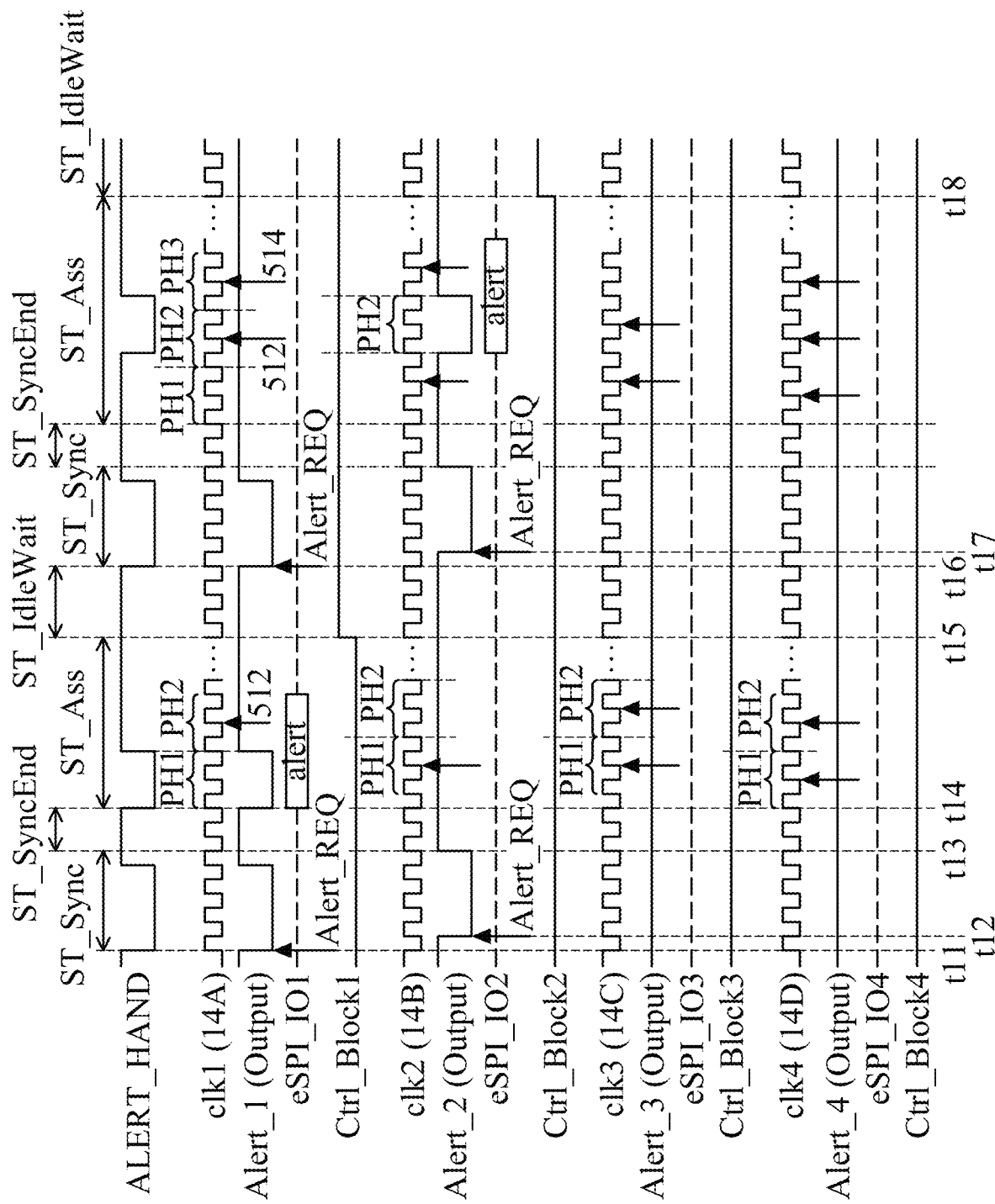
FIG. 5 is an exemplary waveform diagram of an alert handshake control line ALERT_HAND of the present invention, for illustrating operation of driving the alert handshake control line ALERT_HAND according to the scheduling control method of FIG. 4.

Please refer to FIGS. 4 and 5. FIG. 4 is a flowchart of a scheduling control method performed in the bus system 1 of an embodiment of the present invention. The scheduling control method of FIG. 4 can be performed by each of controllers 145A-145D of the slave devices 14A-14D of the bus system 1. FIG. 5 is an exemplary waveform diagram of an alert handshake control line ALERT_HAND, for illustrating operation of driving the alert handshake control line ALERT_HAND according to the scheduling control method of FIG. 4. Furthermore, the waveforms of the clock signals clk1-clk4 and handshake control line ALERT_HAND shown in FIG. 5 are merely examples, and the present invention is not limited thereto.

As shown in FIGS. 4 and 5, the slave devices 14A-14D can use the clock signals clk1-clk4 having the same frequencies, as the base of counting the controllers 145A-145D. In some embodiments, the clock signals clk1-clk4 have the same phases or different phases. The clock signals clk1-clk4 has the same frequencies and same cycles. In some embodiments, the controllers 145A-145D counts or monitors based on rising edges of the clock signals clk1-clk4. In some embodiments, the controllers 145A-145D counts or monitors based on falling edges of the clock signals clk1-clk4.

In a step S410, the controllers 145A-145D control the slave devices 14A-14D to enter an idle wait stage ST_IdleWait, respectively. In the idle wait stage ST_IdleWait, the controllers 145A-145D of the slave devices 14A-14D can control the corresponding alert handshake pins Alert_1-Alert_4 to enter the input mode, respectively, so as to monitor whether the alert handshake control line ALERT_HAND is driven by any one of the slave devices 14A-14D, for example, when the alert handshake control line ALERT_HAND is changed to a high voltage level from a low voltage level, it indicates that the alert handshake control line ALERT_HAND is driven by one of the slave devices 14A-14D.

In the idle wait stage ST_IdleWait, when any one of the controllers 145A-145D of the slave devices 14A-14D receives the interrupt request Alert_REQ, the bus system 1 enters a synchronization phase ST_Sync. After the bus system 1 enters the synchronization phase ST_Sync, the slave device having the interrupt request can control the alert handshake pin to enter the output mode and output low voltage level, to drive the alert handshake control line ALERT_HAND for more than specific number of clock cycles, such as more than three clock cycles, so that the other slave device of the bus system 1 can determine that the bus system 1 enters the synchronization phase ST_Sync, but not other phase (such as assignment phase ST_Ass).

For example, at a time point t11, based on the interrupt request Alert_REQ, the controller 145A of the slave device 14A provides the control signal Ctrl_REQ to the alert handshake pin Alert_1, for example, through the output circuit 150_1 of FIG. 3, so as to drive the alert handshake control line ALERT_HAND. The alert handshake control line ALERT_HAND is changed to low voltage level from high voltage level. Next, at a time point t12, based on the interrupt request Alert_REQ, the controller 145B of the slave device 14B can provide the control signal Ctrl_REQ to the alert handshake pin Alert_2, for example, through the output circuit 150_1 of FIG. 3, so as to drive the alert handshake control line ALERT_HAND.

After the alert handshake control line ALERT_HAND is driven for more than three clock cycles, the slave devices having the interrupt request, such as the slave devices 14A and 14B, stop driving the alert handshake control line ALERT_HAND, and then control the alert handshake pins Alert_1 and Alert_2 to enter the input mode to monitor the alert handshake control line ALERT_HAND. At the same time, the other slave device of the bus system 1, such as the slave devices 14C and 14D, also detect that the alert handshake control line ALERT_HAND is recovered to high voltage level, so at a time point t13 all slave devices enters the synchronization end phase ST_SyncEnd at the same time.

In the synchronization end phase ST_SyncEnd, each of the controllers 145A-145D waits for at least one clock cycle, to ensure that all of the slave devices 14A-14D of the bus system 1 complete the synchronization phase ST_Sync, and then the controllers 145A-145D can control the slave devices 14A-14D to enter the assignment phase ST_Ass from the synchronization end phase ST_SyncEnd.

In the assignment phase ST_Ass, in each assignment period, each of the slave devices 14A-14D monitors the state of the alert handshake control line ALERT_HAND, through the corresponding alert handshake pin. In the assignment phase ST_Ass, each of the slave devices 14A-14D has assignment periods with the same time lengths. In this embodiment, each assignment period has eight clock cycles. Furthermore, each assignment period can be divided into four phases PH1-PH4, and each phase has two clock cycles. In the assignment phase ST_Ass, the slave devices 14A-14D can perform corresponding operations based on the phases PH1-PH4, respectively. In this embodiment, the slave device 14A corresponds to the phase PH1, the slave device 14B corresponds to the phase PH2, the slave device 14C corresponds to the phase PH3, and the slave device 14D corresponds to the phase PH4, which is not shown in figures. By assigning the corresponding phases in the assignment period, the slave devices 14A-14D can be set with the priority to drive the alert handshake control line ALERT_HAND. For example, in each assignment period, the phase PH1 corresponds to first and second clock cycles, the phase PH2 corresponds to third and fourth clock cycles, the phase PH3 corresponds to fifth and sixth clock cycles, and the phase PH4 corresponds to seventh and eighth clock cycles, so that the slave device 14A corresponding to the phase PH1 has the highest priority to drive the alert handshake control line ALERT_HAND, and the slave device 14D corresponding to the phase PH4 has the lowest priority to drive the alert handshake control line ALERT_HAND.

In some embodiments, the corresponding relationship between the slave devices 14A-14D and the phases PH1-PH4 can be determined by the address section selection pins 18A-18D and the address entry selection pins 16A-16D of FIG. 2. In other implementations, other hardware or software setting can be used to determine the corresponding relationship of the slave devices 14A-14D and the phases PH1-PH4. As shown in FIG. 5, the slave devices 14A-14D can count clock cycles in the assignment period based on rising edges, as shown by arrowheads 512 and 514, of the internal clock signals clk1-clk4, thereby monitoring the alert handshake control line ALERT_HAND.

In the assignment phase ST_Ass, when any one of the slave device wants to communicate with the master device 10, the slave device has right to drive the alert handshake control line ALERT_HAND in only the corresponding phase of the assignment period. The slave device 14A is taken as an example for illustration in following paragraph.

When the slave device 14A wants to communicates with the master device 10, the slave device 14A has the right to drive the alert handshake control line ALERT_HAND in only the phase PH1 of the assignment period. Particularly, when the slave device 14A wants to communicate with the master device 10, the controller 145A of the slave device 14A can control the alert handshake pin Alert_1 in the phase PH1 to enter the output mode, and output the control signal Ctrl_Alert to drive the alert handshake control line ALERT_HAND, so as to control the alert handshake control line ALERT_HAND to be at low voltage level. When the slave device 14A does not need to communicate with the master device 10, the controller 145A of the slave device 14A can control the alert handshake pin Alert_1 in the phase PH1 to enter the input mode and not drive the alert handshake control line ALERT_HAND.

In the phases PH2-PH4 of the assignment period, the slave device 14A just monitors the voltage level of the alert handshake control line ALERT_HAND, to determine whether the master device 10 is in communication with the slave devices 14B-14D. In other words, in the phases PH2-PH4, the controller 145A of the slave device 14A can control the alert handshake pin Alert_1 to enter the input mode. For example, in the assignment period, in the phase PH2, which is highlighted by the arrowhead 512, the slave device 14A monitors the voltage level of the alert handshake control line ALERT_HAND through the alert handshake pin Alert_1, so as to determine whether the slave device 14B is in communication with the master device 10. When the slave device 14A detects that the alert handshake control line ALERT_HAND is at high voltage level in the phase PH2, the controller 145A can determine that the slave device 14B is not communication with the master device 10. When the slave device 14A detects that the alert handshake control line ALERT_HAND is at low voltage level in the phase PH2, the controller 145A can determine that the slave device 14B is communicating with the master device 10.

As shown in FIG. 5, each of the slave devices 14A-14D can monitor other phases other than the phase corresponding thereto, to determine which slave device being communicating with the master device 10. Furthermore, by monitoring rising edge, such as the arrowhead 512, or falling edge, not shown in figures, within the phase, the time difference caused by phase offsets of the clock signals clk1-clk4 can be prevented.

Please refer back to FIG. 4. In a step S420, when any one of the controllers 145A-145D of the slave devices 14A-14D detects that the interrupt request Alert_REQ exists on the alert handshake control line ALERT_HAND, the slave devices 14A-14D enter the synchronization phase ST_Sync. In a step S430, each of the controllers 145A-145D determines whether the corresponding one of the slave devices 14A-14D is operated in the blocking mode. In a step S440, when the corresponding slave device is operated in the transmission mode, the controller can determine whether the alert handshake control line ALERT_HAND is driven by the other slave device in the assignment phase ST_Ass. In a step S410, when the alert handshake control line ALERT_HAND is driven by other slave device, the slave device is back to the idle wait stage. In a step S450, when the alert handshake control line ALERT_HAND is not driven by other slave device, the slave device can drive the alert handshake control line ALERT_HAND in the phase corresponding thereto, such as one of the phases PH1-PH4, so as to request to communicate with the master device 10. In a step S460, after the communication with the master device 10 is completed, the slave device enters the blocking mode from the transmission mode, and then enters the idle wait stage in a step S410.

On the other hand, in the step S430, when the slave device is operated in the blocking mode, the slave device does not drive the alert handshake control line ALERT_HAND in the assignment phase ST_Ass in a step S470, so as to block the control signal Ctrl_Alert from being transmitted to the alert handshake pin. Next, in a step S480, the slave device determines whether the alert handshake control line ALERT_HAND is driven by other slave device in the assignment phase ST_Ass. When the alert handshake control line ALERT_HAND is driven by other slave device, the slave device is back to the idle wait stage, in a step S410. In a step S490, when the alert handshake control line ALERT_HAND is not driven by other slave device, the slave device enters the transmission mode from the blocking mode, and is back to the idle wait stage in a step S410.

Please refer back to FIG. 5. In the assignment phase ST_Ass, the slave device 14A, which is operated in the transmission mode and has the highest priority, can obtain the control right of the alert handshake control line ALERT_HAND, so as to communicate to the master device 10. For example, at a time point t14, the alert handshake control line ALERT_HAND can be changed to low voltage level in the phase PH1 of the assignment period of the slave device 14A, so that the slave device 14A obtains the right to communicate with the master device 10. Next, other slave devices 14B-14D detect that the alert handshake control line ALERT_HAND is at the low voltage level in the phase PH1 of the assignment period, so the slave devices 14B-14D can determine that the slave device 14A corresponding to the phase PH1 is in communication with the master device 10, for example, to process the interrupt request. In this embodiment, the control signals Ctrl_Block1-Ctrl_Block4 indicate whether the slave devices 14A-14D are operated in the blocking mode, respectively. For example, when the control signal Ctrl_Block1 is at low logic level, it indicates that the slave device 14A is operated in the transmission mode; when the control signal Ctrl_Block1 is at high logic level, it indicates that the slave device 14A is operated in the blocking mode. It should be noted that the above-mentioned logic levels of the control signal Ctrl_Block1-Ctrl_Block4 are merely examples for illustration, and the present invention is not limited thereto.

When the slave device 14A is communicating with the master device 10, the slave device 14A provides an event alert signal "alert" to the input/output (I/O) signal line eSPI_IO of the bus 12 through the input/output (I/O) signal line eSPI_IO1, so as to transmit the event alert signal "alert" to the master device 10. The event alert signal "alert" is a request signal indicating that the slave device 14A requests communication with the master device 10. When detecting that the slave device 14A drives the alert handshake control line ALERT_HAND but wanting to communicate with the master device 10, the slave devices 14B-14D can store the event message and later communicate with the master device 10 after obtaining the control right to drive handshake control line ALERT_HAND.

When the slave device 14A is in communication with the master device 10, the slave device 14A can drive the alert handshake control line ALERT_HAND in the phase PH1 of each assignment period of the assignment phase ST_Ass, until the communication with the master device 10 is ended. After the communication with the master device 10 is ended, the slave device 14A stops driving the alert handshake control line ALERT_HAND in the phase PH1 of the assignment period, so the slave devices 14A-14D enter the idle wait stage ST_IdleWait at a time point t15. As mentioned previously, in the idle wait stage ST_IdleWait, the controllers 145A-145D of the slave devices 14A-14D can control the corresponding alert handshake pin Alert_1-Alert_4, respectively, to enter the input mode, so as to monitor whether the alert handshake control line ALERT_HAND is driven by the slave devices 14A-14D. Furthermore, before entering the idle wait stage ST_IdleWait, the slave device 14A is switched to the blocking mode from the transmission mode, and the control signal Ctrl_Block1 can be changed to high logic level from low logic level.

Next, at a time point t16, the slave device 14A operating in the blocking mode can provide the control signal Ctrl_REQ to the alert handshake pin Alert_1 based on the interrupt request Alert_REQ, and output low voltage level to drive the alert handshake control line ALERT_HAND within three clock cycles of the clock signal clk1, so as to notify the slave devices 14B-14D to enter the synchronization phase ST_Sync. Furthermore, at a time point t17, the slave device 14B can provide the control signal Ctrl_REQ to the alert handshake pin Alert_2 based on the interrupt request Alert_REQ, to drive the alert handshake control line ALERT_HAND. Next, the bus system 1 enters the synchronization end phase ST_SyncEnd and the assignment phase ST_Ass in a sequential order.

Since the slave device 14A is operated in the blocking mode, the slave device 14A does not drive the alert handshake control line ALERT_HAND in the assignment phase ST_Ass; in other words, the slave device 14A blocks the priority thereof and does not occupy the alert handshake control line ALERT_HAND. Therefore, the alert handshake control line ALERT_HAND can be released to the slave devices 14B-14D. Next, the slave device 14B having higher priority has the right to drive the alert handshake control line ALERT_HAND in the phase PH2 of the assignment period. In the assignment phase ST_Ass, the slave device 14B, which is operated in the transmission mode and the control signal Ctrl_Block2 thereof is at low logic level, can control the alert handshake pin Alert_2 to enter the output mode in the phase PH2, and output the control signal Ctrl_Alert to drive the alert handshake control line ALERT_HAND, and perform sequential communication. When the slave device 14B is communicating with the master device 10, the slave device 14B provides the event alert signal "alert" to the input/output (I/O) signal line eSPI_IO of the bus 12 through the input/output signal line eSPI 1O2, so as to transmit the event alert signal "alert" to the master device 10. When the communication with the master device 10 is ended, the slave device 14B stops driving the alert handshake control line ALERT_HAND in the assignment period, all of the slave devices 14A-14D enter the idle wait stage ST_IdleWait at a time point t18. Furthermore, before entering the idle wait stage ST_IdleWait, the slave device 14B is switched to the blocking mode from the transmission mode and the control signal Ctrl_Block2 is changed to high logic level from low logic level.

Figure 6:
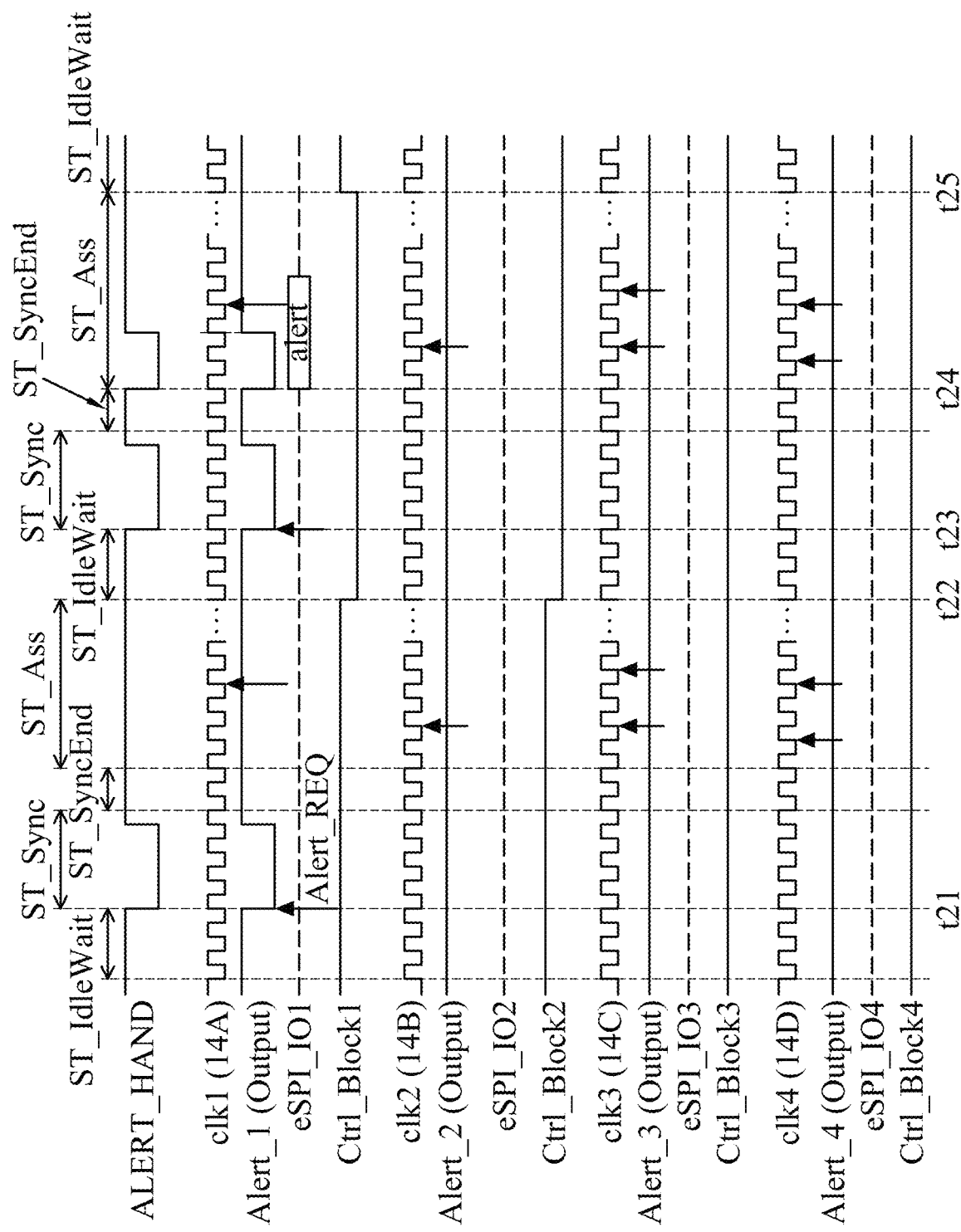
FIG. 6 is an exemplary waveform diagram of an alert handshake control line ALERT_HAND, for illustrating operation of driving the alert handshake control line ALERT_HAND according to the scheduling control method of FIG. 4.

FIG. 6 is an exemplary waveform diagram of an alert handshake control line ALERT_HAND, to illustrate an operation of the slave devices 14A-14D to drive the alert handshake control line ALERT_HAND, according to the scheduling control method of FIG. 4. Please refer to FIGS. 4 and 6. In a step S410, the controllers 145A-145D control the slave devices 14A-14D to enter the idle wait stage ST_IdleWait, respectively; at this time, the slave devices 14A and 14B are operated in the blocking mode, and the slave devices 14C and 14D are operated in the transmission mode. Next, at a time point t21, the slave device 14A, which is operated in the blocking mode and the control signal Ctrl_Block1 thereof is at high logic level, can provide the control signal Ctrl_REQ to the alert handshake pin Alert_1 based on the interrupt request Alert_REQ, and output signal with low voltage level to drive the alert handshake control line ALERT_HAND within three clock cycles of the clock signal clk1, so as to notify the slave devices 14B-14D to enter the synchronization phase ST_Sync. Next, the bus system 1 enters the synchronization end phase ST_SyncEnd and the assignment phase ST_Ass, in a sequential order.

As mentioned previously, since the slave device 14A is operated in the blocking mode, the slave device 14A does not drive the alert handshake control line ALERT_HAND in the assignment phase ST_Ass in a step S470. Furthermore, in a step S480, the slave device 14A can determine whether the alert handshake control line ALERT_HAND is driven by other slave device in the assignment phase ST_Ass. In the assignment phase ST_Ass, when the alert handshake control line ALERT_HAND is driven by other slave device, the bus system 1 is back to the idle wait stage ST_IdleWait, in a step S410. Furthermore, when the assignment phase ST_Ass is ended at a time point t22, the slave devices 14A and 14B are switched to the transmission mode from the blocking mode, and the control signals Ctrl_Block1 and the Ctrl_Block2 are changed to low logic level from high logic level; in other words, when any slave device operating in the blocking mode needs to communicate with the master device 10 again, the slave device must output the interrupt request Alert_REQ first through the alert handshake control line ALERT_HAND, and then determine whether the alert handshake control line ALERT_HAND is driven by other slave device. When the alert handshake control line ALERT_HAND is not driven by other slave device, the slave device can release the alert handshake pin from the blocking state, so as to drive the alert handshake control line ALERT_HAND through the alert handshake pin again.

In a time point t24, the slave device 14A, which is operated in the transmission mode and the control signal Ctrl_Block1 is at low logic level, can provide the control signal Ctrl_REQ to the alert handshake pin Alert_1 based on the interrupt request Alert_REQ, and output signal with low voltage level to drive the alert handshake control line ALERT_HAND within three clock cycles of the clock signal clk1, so as to notify the slave devices 14B-14D to enter the synchronization phase ST_Sync. Next, the bus system 1 enter the synchronization end phase ST_SyncEnd and the assignment phase ST_Ass, in a sequential order. In the assignment phase ST_Ass, the alert handshake control line ALERT_HAND is changed to low voltage level in the phase PH1 of the assignment period of the slave device 14A. As a result, the slave device 14A can obtain the right to communicate with the master device 10 again. After the communication with the master device 10 is ended, the slave device 14A does not drive the alert handshake control line ALERT_HAND in the phase PH1 of the assignment period, and the slave devices 14A-14D can enter the idle wait stage ST_IdleWait at a time point t25. As mentioned previously, before entering the idle wait stage ST_IdleWait, the slave device 14A is switched to the blocking mode from the transmission mode and the control signal Ctrl_Block1 is changed to high logic level from low logic level.

Figure 7A:
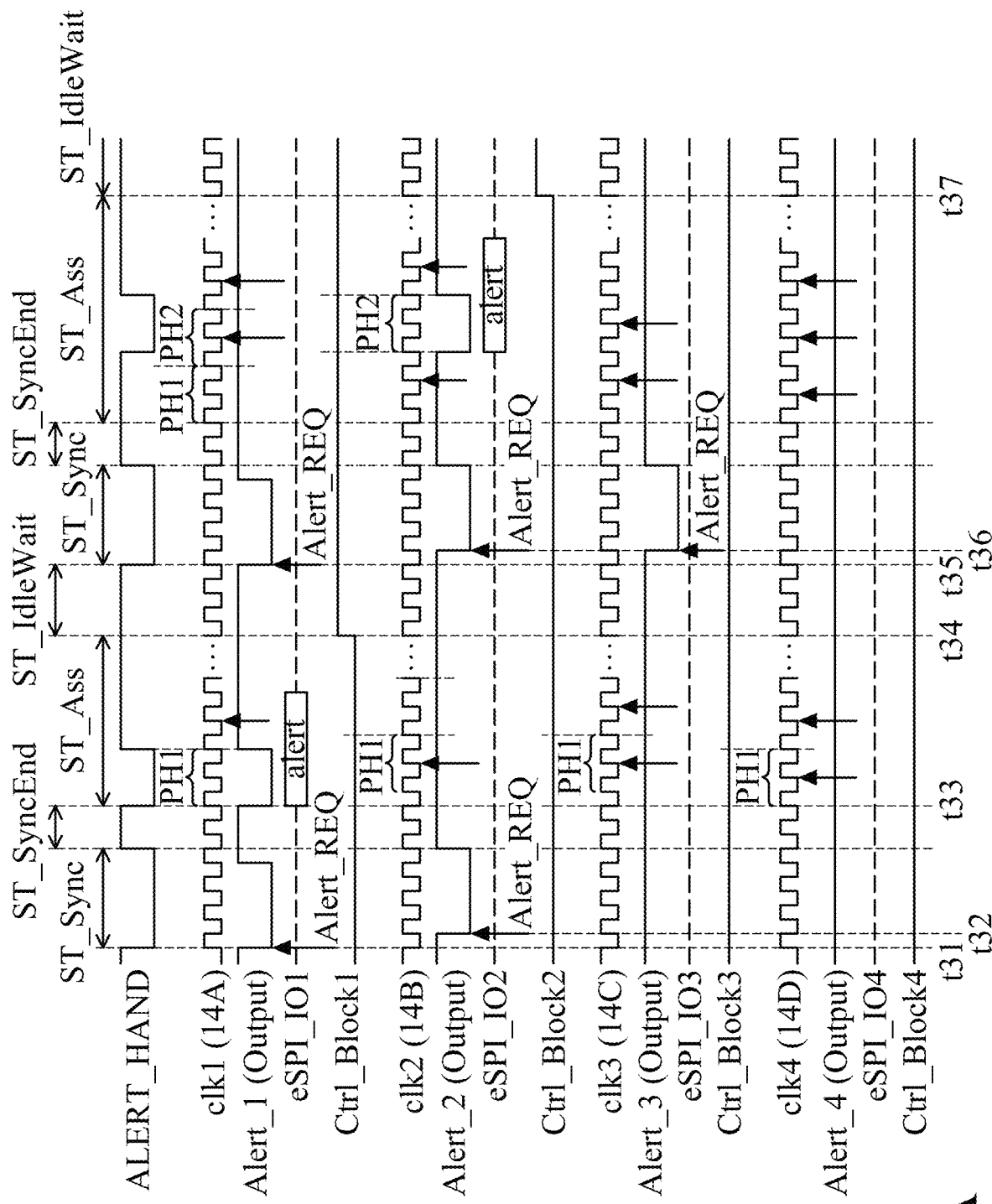
FIGS. 7A to 7C are exemplary waveform diagrams of an alert handshake control line ALERT_HAND, for illustrating an operation of driving handshake control line ALERT_HAND according to the scheduling control method of FIG. 4 in a slave device of a bus system.
Figure 7B:
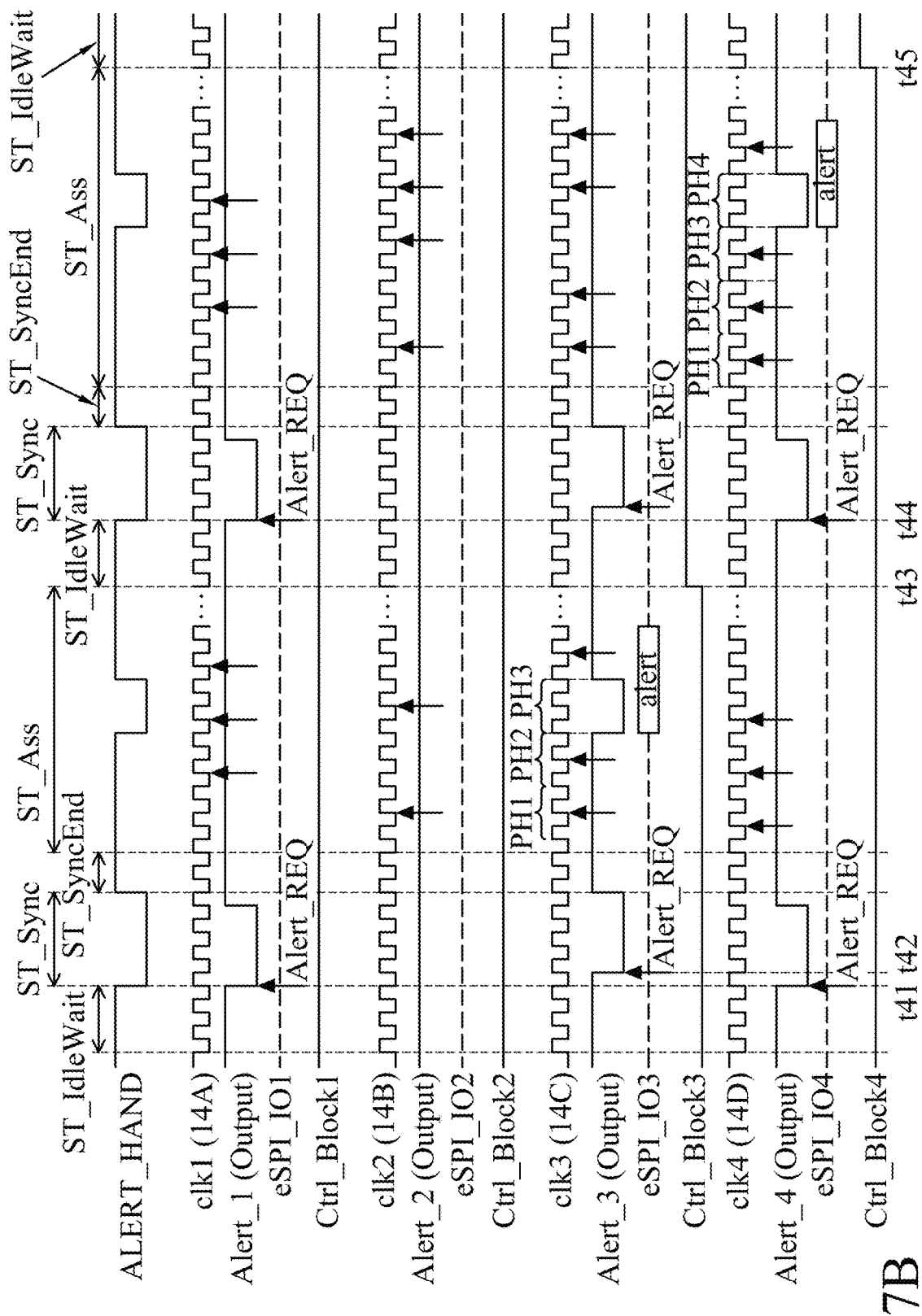
Figure 7C:
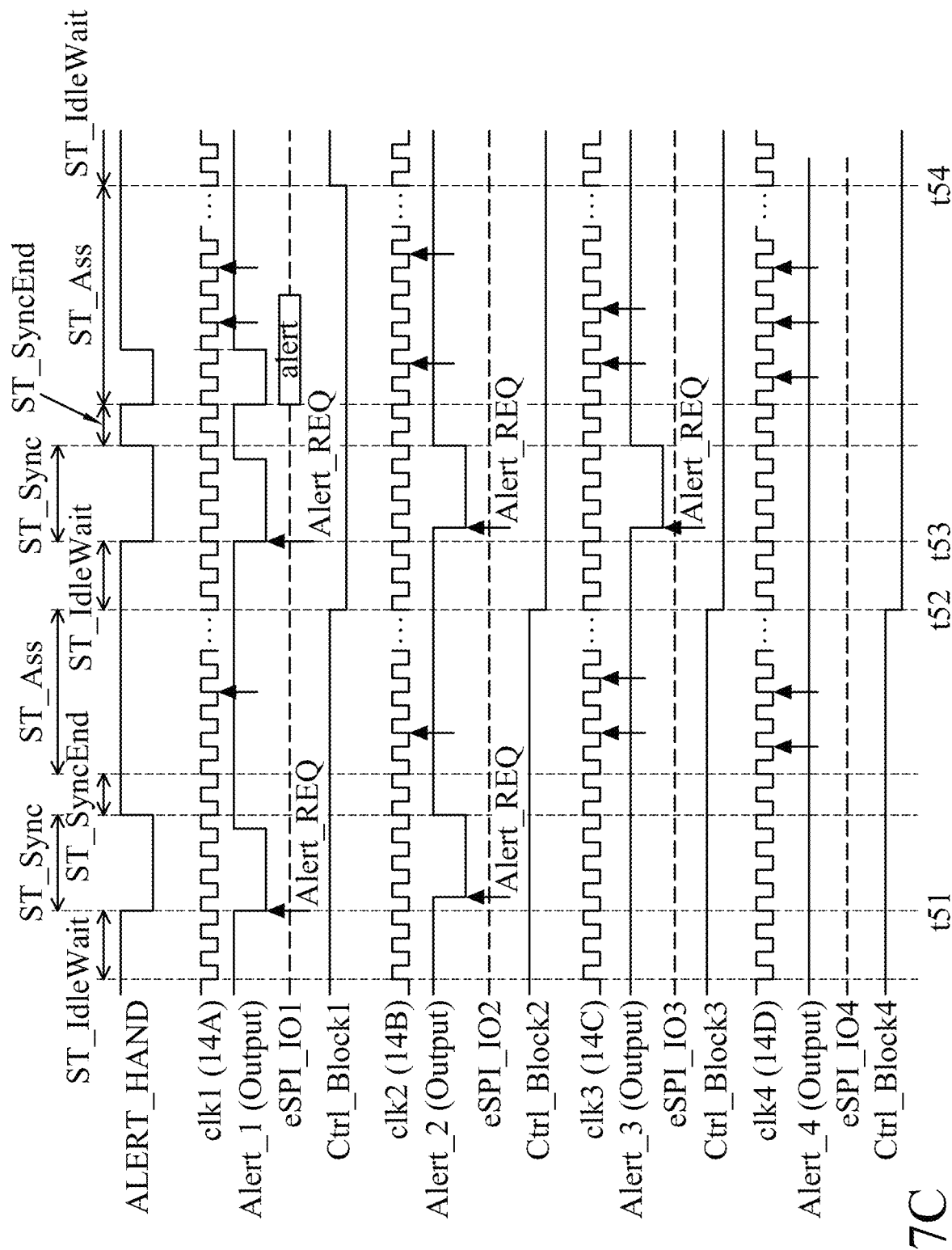

FIGS. 7A and 7C are an exemplary waveform diagrams of an alert handshake control line ALERT_HAND, for illustrating an operation of the slave devices 14A-14D to drive the alert handshake control line ALERT_HAND in the bus system 1, according to the scheduling control method of FIG. 4.

As shown in FIG. 7A, in an initial state, the slave devices 14A-14D is operated in the transmission mode. Next, at a time point t31, the slave device 14A provides the control signal Ctrl_REQ to the alert handshake pin Alert_1 based on the interrupt request Alert_REQ, and output signal with low voltage level to drive the alert handshake control line ALERT_HAND within three clock cycles of the clock signal clk1, so as to notify the slave devices 14B-14D to enter the synchronization phase ST_Sync. Next, at a time point t32, the slave device 14B provides the control signal Ctrl_REQ to the alert handshake pin Alert_2 based on the interrupt request Alert_REQ, so as to drive the alert handshake control line ALERT_HAND. Next, the bus system 1 enters the synchronization end phase ST_SyncEnd and the assignment phase ST_Ass in a sequential order.

At a time point t33, the slave device 14A having the higher priority can control the alert handshake control line ALERT_HAND to be at the low voltage level in the phase PH1 of the assignment period, so as to obtain the right to communicate with the master device 10. Furthermore, the slave devices 14B-14D can detect that the alert handshake control line ALERT_HAND is at low voltage level in the phase PH1 of the assignment period, so the slave devices 14B-14D can determine that the slave device 14A corresponding to the phase PH1 is in communication with the master device 10, for example, to process the interrupt request. After the communication with the master device 10 is completed, the slave device 14A is switched to the blocking mode from the transmission mode at the time point t34, and the control signal Ctrl_Block1 can be changed to the high logic level from the low logic level.

Next, the slave devices 14A-14D enter the idle wait stage ST_IdleWait.

At a time point t35, the slave device 14A operating in the blocking mode can provide the control signal Ctrl_REQ to the alert handshake pin Alert_1 based on the interrupt request Alert_REQ thereof, and output signal with low voltage level to drive the alert handshake control line ALERT_HAND within three clock cycles of the clock signal clk1, so as to notify the slave devices 14B-14D to enter the synchronization phase ST_Sync. Furthermore, at a time point t36, the slave devices 14B and 14C can provide the control signal Ctrl_REQ to the alert handshake pin Alert_2 based on the interrupt request Alert_REQ, so as to drive the alert handshake control line ALERT_HAND. Next, the bus system 1 enters the synchronization end phase ST_SyncEnd and the assignment phase ST_Ass in a sequential order.

In the assignment phase ST_Ass, since the slave device 14A is operated in the blocking mode, the slave device 14A does not occupy the alert handshake control line ALERT_HAND, and the alert handshake control line ALERT_HAND can be released to the slave devices 14B-14D. The slave device 14B having the higher priority has the right to drive the alert handshake control line ALERT_HAND in the phase PH2 of the assignment period. As mentioned previously, when the communication between the slave device 14B and the master device 10 is ended, the slave device 14B is switched to the blocking mode from the transmission mode and the control signal Ctrl_Block2 is changed to high logic level from low logic level, at a time point t37. Furthermore, the slave devices 14A-14D enter the idle wait stage ST_IdleWait.

As shown in FIG. 7B, at a time point t41, the slave device 14A operating in the blocking mode can provide the control signal Ctrl_REQ to the alert handshake pin Alert_1 based on the interrupt request Alert_REQ, and output signal with low voltage level to drive the alert handshake control line ALERT_HAND within three clock cycles of the clock signal clk1, so as to notify the slave devices 14B-14D, to enter the synchronization phase ST_Sync; at the same time, the slave device 14D operating in the transmission mode can provide the control signal Ctrl_REQ to the alert handshake pin Alert_1 based on the interrupt request Alert_REQ, and output signal with low voltage level, within three clock cycles of the clock signal clk4. Next, at a time point t42, the slave device 14C operating in the transmission mode can provide the control signal Ctrl_REQ to the alert handshake pin Alert_1 based on the interrupt request Alert_REQ, and output signal with low voltage level within three clock cycles of the clock signal clk3. Next, the bus system 1 enters the synchronization end phase ST_SyncEnd and the assignment phase ST_Ass in a sequential order.

In the assignment phase ST_Ass, since the slave device 14A is operated in the blocking mode, the salve device 14A does not occupy the alert handshake control line ALERT_HAND, and the alert handshake control line ALERT_HAND can be released to the slave devices 14B-14D. The slave device 14C having the higher priority has the right to drive the alert handshake control line ALERT_HAND in the phase PH3 of the assignment period. As mentioned previously, when the communication between the slave device 14C and the master device 10 is ended, the slave device 14C is switched to the blocking mode from the transmission mode, and the control signal Ctrl_Block3 is changed to high logic level from low logic level, at the time point t43. Furthermore, the slave devices 14A-14D enters the idle wait stage ST_IdleWait.

At the time point t44, the slave device 14A operating in the blocking mode can provide the control signal Ctrl_REQ to the alert handshake pin Alert_1 based on the interrupt request Alert_REQ, and output signal with low voltage level to drive the alert handshake control line ALERT_HAND within three clock cycles of the clock signal clk1, so as to notify the slave devices 14B-14D to enter the synchronization phase ST_Sync. In the synchronization phase ST_Sync, the slave devices 14C and 14D drive the alert handshake control line ALERT_HAND based on the interrupt request Alert_REQ thereof. Next, the bus system 1 enters the synchronization end phase ST_SyncEnd and the assignment phase ST_Ass in a sequential order.

In the assignment phase ST_Ass, since the slave devices 14A and 14C are operated in the blocking mode, the slave devices 14A and 14C do not occupy the alert handshake control line ALERT_HAND, and the alert handshake control line ALERT_HAND is released to the slave device 14D. The slave device 14D has the right to drive the alert handshake control line ALERT_HAND in the phase PH4 of the assignment period. As mentioned previously, when the communication between the slave device 14D and the master device 10 is ended, the slave device 14D is switched to the blocking mode from the transmission mode, and the control signal Ctrl_Block4 is changed to high logic level from low logic level, at the time point t45. Furthermore, the slave devices 14A-14D enter the idle wait stage ST_IdleWait.

As shown in FIGS. 7A and 7B, when a plurality of interrupt requests Alert_REQ occur, the slave device 14A having the higher priority can drive the alert handshake control line ALERT_HAND first. After the communication corresponding to the interrupt request Alert_REQ is completed, the slave device 14A can block the priority thereof, so as to release the alert handshake control line ALERT_HAND to the slave devices 14B-14D having lower priorities. In other words, after driving the alert handshake control line ALERT_HAND, each of the slave devices 14A-14D can block the priority thereof, so as to prevent the alert handshake control line ALERT_HAND from being continuously occupied by the slave device having higher priority.

As shown in FIG. 7C, at the time point t51, the slave device 14A operating in the blocking mode can provide the control signal Ctrl_REQ to the alert handshake pin Alert_1 based on the interrupt request Alert_REQ, and output signal with low voltage level to drive the alert handshake control line ALERT_HAND within three clock cycles of the clock signal clk1, so as to notify the slave devices 14B-14D to enter the synchronization phase ST_Sync; at the same time, the slave device 14B operating in the blocking mode can provide the control signal Ctrl_REQ to the alert handshake pin Alert_1 based on the interrupt request Alert_REQ, and output signal with low voltage level within three clock cycles of the clock signal clk2. Next, the bus system 1 enters the synchronization end phase ST_SyncEnd and the assignment phase ST_Ass in a sequential order.

In the assignment phase ST_Ass, since the slave devices 14A and 14B are operated in the blocking mode, the slave devices 14A and 14B do not occupy the alert handshake control line ALERT_HAND. In the assignment phase ST_Ass, each of the slave devices 14A-14D can detect whether the alert handshake control line ALERT_HAND is driven. At the time point t52, in the assignment phase ST_Ass, when determining that the alert handshake control line ALERT_HAND is not driven, at least one of the slave devices 14A-14D operating in the blocking mode is switched to the transmission mode.

At a time point t53, the slave device 14A operating in the transmission mode can provide the control signal Ctrl_REQ to the alert handshake pin Alert_1 based on the interrupt request Alert_REQ, and output signal with low voltage level to drive the alert handshake control line ALERT_HAND within three clock cycles of the clock signal clk1, so as to notify the slave devices 14B-14D to enter the synchronization phase ST_Sync. In the synchronization phase ST_Sync, the slave devices 14B and 14C drive the alert handshake control line ALERT_HAND based on the interrupt request Alert_REQ. Next, the bus system 1 enters the synchronization end phase ST_SyncEnd and the assignment phase ST_Ass in a sequential order.

In the assignment phase ST_Ass, the slave device 14A has the highest priority, so the slave device 14A has the right to drive the alert handshake control line ALERT_HAND in the phase PH1 of the assignment period. As mentioned previously, when the communication between the slave device 14A and the master device 10 is ended, the slave device 14A is switched to the blocking mode from the transmission mode and the control signal Ctrl_Block1 is changed to high logic level from low logic level. Furthermore, the slave devices 14A-14D enter the idle wait stage ST_IdleWait, at the time point t54.

As shown in FIG. 7C, in a condition that any one of the slave devices 14A-14D issues the interrupt request Alert_REQ, that is, in the synchronization phase ST_Sync, when the alert handshake control line ALERT_HAND is not driven in the assignment phase ST_Ass, each of the slave devices 14A-14D can release the alert handshake pin thereof from the blocking state, that is, the slave devices 14A-14D are switched to the transmission mode from the blocking mode. The slave devices 14A-14D can drive the alert handshake control line ALERT_HAND based on the priorities thereof.

Figure 8:
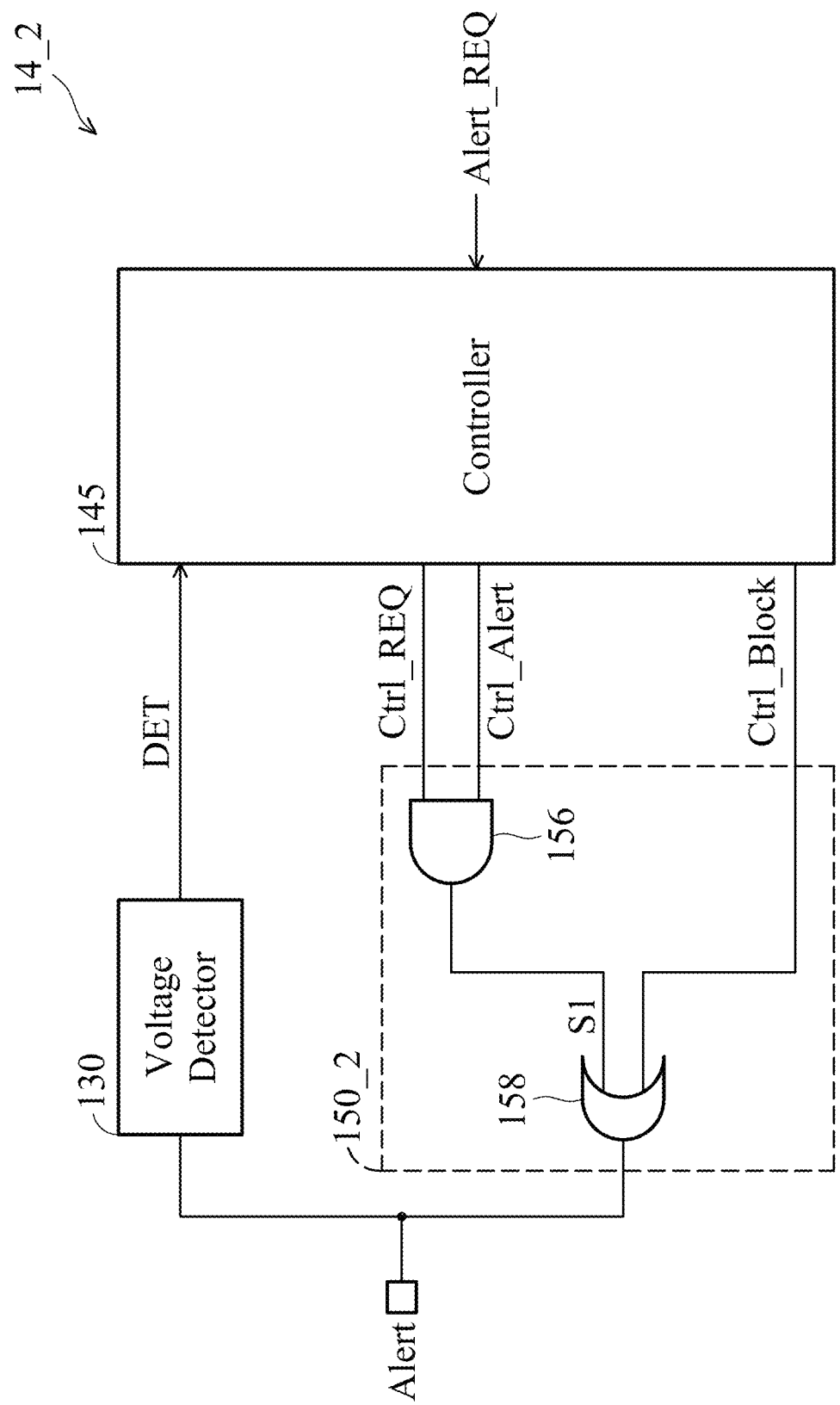
FIG. 8 is a slave device of an embodiment of the present invention.

FIG. 8 is a schematic diagram of a slave device 14_2 of an embodiment of the present invention. The slave device 14_2 comprise the alert handshake pin Alert, the voltage detector 130, the controller 145, and an output circuit 150_2. Compared with the output circuit 150_1 of FIG. 3, the output circuit 150_2 comprises logic circuits 156 and 158. In this embodiment, the logic circuit 156 can be an AND logic gate, and the logic circuit 158 can be an OR logic gate. The logic circuit 156 provides the control signal S1 based on the control signal Ctrl_Alert and the control signal Ctrl_REQ. The logic circuit 158 determines whether to provide the control signal S1 to the alert handshake pin Alert, based on a control signal Ctrl_Block. In this embodiment, when the control signal Ctrl_Block instructs the slave device 14_2 to operate in the blocking mode, the logic circuit 158 does not provide the control signal S1 to handshake pin Alert; otherwise, when the control signal Ctrl_Block instructs the slave device 14_2 to operate in the transmission mode, the logic circuit 158 provides the control signal S1 to the alert handshake pin Alert. In other words, when receiving the interrupt request Alert_REQ, the slave device 14_2 operating in the blocking mode does not drive the alert handshake control line ALERT_HAND in the synchronization phase ST_Sync. In this condition, when the slave device 14_2 detects that the alert handshake control line ALERT_HAND is not driven for a specific period, the alert handshake pin Alert is released from the blocking state, and the slave device 14_2 is switched to the transmission mode from the blocking mode. It should be noted that, the logic circuits 156 and 158 are examples only, and the present invention is not limited thereto.

According to the scheduling control method of the embodiment of the present invention, the eSPI bus of the bus system can be prevented from being occupied by the slave device having the higher priority. By setting the slave device to operate in the blocking mode, the bus system can balance the priorities of the slave devices, so as to ensure that each slave device has the same opportunity to use the eSPI bus, thereby improving communication efficiency of the bus system. For example, in an application in which the display information is transmitted to a plurality of display devices or screens through the eSPI bus, the priority balance manner of the present invention can prevent the display devices having higher priority from occupying the eSPI bus to continuously transmitting information, and further prevent the display information of the display device having lower priority from being blocked to cause failure of the display device to update information. According to the scheduling control method of the embodiment of the present invention, the display devices having different priorities can be uniformly assigned to use the eSPI bus to transmit display information.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An integrated circuit, comprising:
a specific pin;
an output circuit coupled to the specific pin;
a voltage detector coupled to the specific pin, and configured to obtain a detection voltage value from the specific pin; and
a controller, in response to an alert request, configured to provide a control signal to the output circuit based on the detection voltage value, so as to selectively control the output circuit to transmit an alert signal with a specific voltage level to the specific pin;
wherein when the control signal instructs the integrated circuit to operate in a blocking mode, the output circuit blocks the alert signal with the specific voltage level from being transmitted to the specific pin, and when the control signal instructs the integrated circuit to operate in a transmission mode, the output circuit transmits the alert signal with the specific voltage level to the specific pin,
wherein the voltage detector is coupled between the specific pin and the controller.

2. The integrated circuit according to claim 1, wherein when the controller receives the alert request and the control signal instructs the integrated circuit to operate in the transmission mode, the controller determines whether the detection voltage value is equal to a preset voltage value, and when the detection voltage value is equal to the preset voltage value, the controller provides the alert signal to the output circuit, so as to transmit the alert signal to the specific pin through the output circuit.

3. The integrated circuit according to claim 2, wherein when the detection voltage value is not equal to the preset voltage value, the controller does not provide the alert signal to the output circuit.

4. The integrated circuit according to claim 1, wherein when the controller receives the alert request and the control signal instructs the integrated circuit to operate in the blocking mode, the controller determines whether the detection voltage value is equal to a preset voltage value, and when the detection voltage value is equal to the preset voltage value, the controller changes the control signal, so as to control the output circuit to operate in the transmission mode.

5. A bus system, comprising:
a master device;
a bus; and
a plurality of slave devices electrically connected to the master device through the bus;
wherein each of the plurality of slave devices comprises a handshake pin, and the alert handshake pins of the plurality of slave devices are electrically connected to each other through an alert handshake control line;
wherein when at least one of the plurality of slave devices is operated in a blocking mode, the at least one of the plurality of slave device does not provide an alert signal with a specific voltage level to drive the alert handshake control line through the corresponding alert handshake pin, wherein each of the plurality of slave devices comprise:
an output circuit coupled to the alert handshake pin;
a voltage detector, configured to obtain a detection voltage value of the alert handshake control line from the alert handshake pin;
a controller, in response to an alert request, configured to provide a control signal to the output circuit based on the detection voltage value, so as to selectively control the output circuit to transmit the alert signal to the alert handshake pin;
wherein when the control signal instructs the slave device to operate in the blocking mode, the output circuit blocks the alert signal with the specific voltage level from being transmitted to the alert handshake pin, and when the control signal instructs the slave device to operate in a transmission mode, the output circuit transmits the alert signal with the specific voltage level to the alert handshake pin,
wherein the voltage detector is coupled between the alert handshake pin and the controller.

6. The bus system according to claim 5, wherein when the controller receives the alert request and the control signal instructs the slave device to operate in the transmission mode, the controller determines whether the detection voltage value is equal to a preset voltage value, and when the detection voltage value is equal to the preset voltage value, the controller provides the alert signal to the output circuit, so as to transmit the alert signal to the alert handshake pin through the output circuit.

7. The bus system according to claim 5, wherein when the controller receives the alert request, the controller provides a request signal to the output circuit, so as to selectively control the output circuit to transmit the request signal to the alert handshake pin, and when the control signal instructs the slave device to operate in the blocking mode, the output circuit blocks the request signal from being transmitted to the alert handshake pin, and when the control signal instructs the slave device to operate in the transmission mode, the output circuit transmits the request signal to the alert handshake pin.

8. A scheduling method, applied to one of a plurality of slave devices of a bus system, wherein the plurality of slave devices are electrically connected to a master device through a bus, and each of the plurality of slave devices comprises an alert handshake pin, a voltage detector and a controller, and the alert handshake pins of the plurality of slave devices are electrically connected to each other through an alert handshake control line, and the scheduling method comprises:
through the alert handshake pin, obtaining a detection voltage value of the alert handshake control line by the voltage detector; and
in response to an alert request, determining whether to transmit an alert signal with a specific voltage level to the alert handshake control line through the alert handshake pin by the controller, based on the detection voltage value,
wherein the voltage detector is coupled between the alert handshake pin and the controller.

9. The scheduling method according to claim 8, wherein the step of, in response to the alert request, determining whether to transmit the alert signal to the alert handshake control line through the alert handshake pin, based on the detection voltage value, further comprises:
when the detection voltage value is equal to a preset voltage value and the slave device is operated in a transmission mode, transmitting the alert signal to the alert handshake control line through the alert handshake pin; and
after the alert signal is transmitted to the alert handshake control line, switching the slave device to a blocking mode from the transmission mode.

10. The scheduling method according to claim 9, wherein the step of, in response to the alert request, determining whether to transmit the alert signal to the alert handshake control line through the alert handshake pin, based on the detection voltage value, further comprises:
when the slave device is operated in the blocking mode, blocking the alert signal from being transmitted to the alert handshake control line through the alert handshake pin; and
after the alert signal is blocked from being transmitted to the alert handshake control line through the alert handshake pin, switching the slave device to the transmission mode from the blocking mode.

* * * * *